C. F. WALP, A. J. HICKS AND F. O. REEDY.
SUSPENSION HOOK.
APPLICATION FILED MAR. 29, 1920.
1,388,132. Patented Aug. 16, 1921.
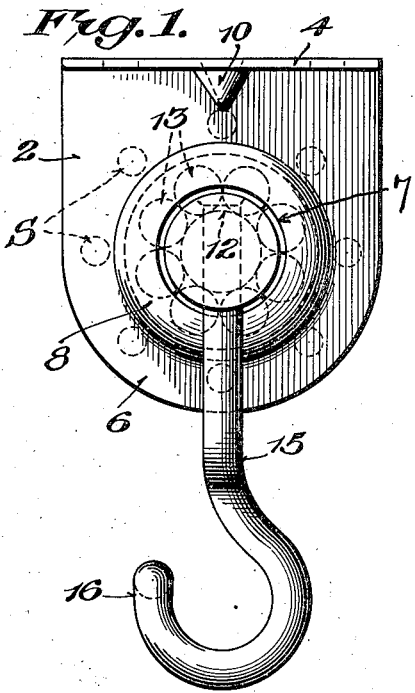
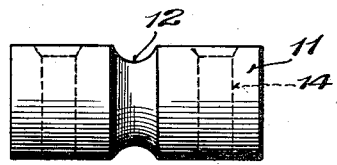
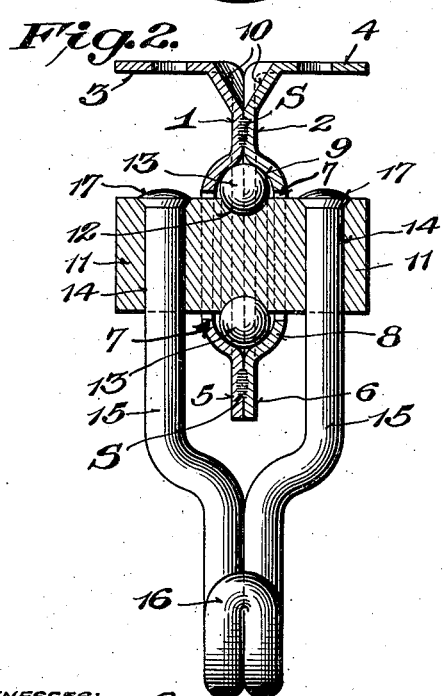
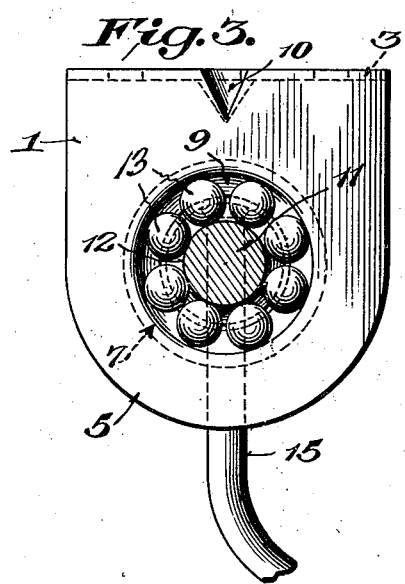
Inventors
C. F. WALP
A. J. HICKS
F. O. REEDY

UNITED STATES PATENT OFFICE.

CHARLES F. WALP, ATWOOD J. HICKS, AND FRED O. REEDY, OF BERWICK, PENNSYLVANIA.

SUSPENSION-HOOK.

1,388,132.  Specification of Letters Patent.  Patented Aug. 16, 1921.

Application filed March 29, 1920. Serial No. 369,704.

*To all whom it may concern:*

Be it known that we, CHARLES F. WALP, ATWOOD J. HICKS, and FRED O. REEDY, citizens of the United States, residing at Berwick, R. D. #2, Briar Creek, Pa., and Berwick, in the county of Columbia and State of Pennsylvania, have invented certain new and useful Improvements in Suspension-Hooks, of which the following is a specification.

This invention relates to suspension hooks, and has particular reference to an improvement in devices especially adapted for supporting porch swings, hammocks and the like.

A primary object of the invention is to provide a hanger having novel structural features and characteristics which permit of metallic stampings and similar readily formed and standardized parts being used thereby materially enhancing the value of the invention from a commercial standpoint, while at the same time providing a thoroughly substantial and reliable hanger which will meet various conditions and requirements of use.

A further object of the invention is to provide a suspension hook which will permit the swing, hammock or the like to oscillate freely without undue friction or wear, thus not only materially increasing the life of the device but at the same time rendering the same safe through the elimination of rapid wear which frequently causes the supporting hook to be ruptured and break with possible injury to the occupant of the hammock or swing supported thereby.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings in which:

Figure 1 is a side elevation of the improved suspension hook.

Fig. 2 is a vertical sectional view thereof.

Fig. 3 is a vertical sectional view taken at right angles to Fig. 2.

Fig. 4 is a detail view of the supporting axle or bearing roller.

Similar reference characters designate corresponding parts throughout the several figures of the drawings.

In attaining the objects of the present invention it is proposed to employ comparatively few and simple parts which may be readily standardized and therefore produced in quantities, and which in assembled relation meet all of the necessary requirements as to strength and rigidity to enable the finished device to meet the strains and thrusts imposed thereon in actual use. In this connection it is proposed to employ elements or parts that are particularly adapted to be fastened together by means of spot welding or equivalent welding operations to thereby eliminate individual fastenings and insure a thoroughly stable product.

Accordingly, as will be observed from the drawings the present improvement contemplates the use of a hanger unit consisting of the suspension plates 1 and 2 which may be conveniently stamped from sheet metal. These plates are preferably of the angular cross-section shown in the drawing to provide the relatively horizontal attaching portions 3 and 4 respectively, and the pendant supporting portions 5 and 6 that are provided with the openings 7—7 and the outwardly bowed cheeks 8 which combine to provide an annular ball bearing race 9 when the plates are assembled.

It will therefore be apparent that the plate members 1 and 2 of the hanger unit are of such a character that they may be readily formed by dies of suitable design from sheet material to provide the attaching portion referred to and the relatively vertically disposed hanger portion, whereby the said plates may be assembled with their flat faces in contacting or meeting relation to permit of the same being joined or connected by means of the spot welds S as indicated in the drawings. Another feature of the members 1 and 2 which materially increases their strength is the provision of the obliquely disposed reinforcing webs or throats 10 located in the interior angles of the plates to prevent the pendant portions from moving with a hinge-like effect with respect to the attaching flanges 3 and 4. This is a practical and important feature in the design of the said plates 1 and 2 since it enables the same to withstand side thrusts which might otherwise have a damaging effect on the efficiency of the hanger.

Another novel and distinctive feature of the invention is the provision of a bearing spool or roller 11 which is provided at its intermediate portion with an annular groove 12 for receiving the ball-bearings 13 adapted to be confined within the walls of the ball race 9 previously referred to, and also having adjacent each end thereof, the diametrically disposed openings 14 for receiving the spaced arms 15 of a suspension hook 16 that is preferably formed in one piece as shown in the drawings. The upper ends of the said arms 15 which project through the openings 13 are upset or headed as indicated at 17 and then welded to secure the same rigidly in the spool. And, for the purpose of rendering this connection rigid and stable beyond all danger of separation it is intended to weld the said headed portions 17 of the arms to the body of the spool by an arc or gas weld, in the well known manner. Thus, it will be apparent that the suspension hook 16 may be rigidly united with the supporting spool or roller in such a manner as to insure ample safety when in use.

In the initial assembly of the hanger it will be apparent that the spool 11 may be inserted through the opening 7 of one of the plates of the hanger unit whereby its annular groove 12 will coöperate with a part of the ball race 9 to receive the anti-friction balls 13. When the said balls have been placed in position the opposite plate member may be assembled over the opposite end of the roller whereupon the two plates may be spot welded together to thereby firmly lock the roller in place and securely hold it against lateral displacement but permitting free rotary movement. The forked arms of the suspension hook 16 may then be inserted in the openings 14 of the spool 11 so that the ends 17 thereof may be upset in the counter-sunk portions of the openings and then welded as heretofore indicated.

From the foregoing it is believed that it will be apparent that the novel structural features and characteristics, and the general assembly of parts which permit of the use of welding as the means for fastening the parts together, will be readily understood without further description. However, it will of course be understood that changes in the form, proportion and minor details of construction may be resorted to without departing from the spirit of the invention or scope of the appended claims.

We claim:

1. A suspension hook of the class described including a pair of complemental hanger plates bent to provide an attaching portion and a hook supporting portion, the said hook supporting portion of each plate being provided with an opening, a reinforcing rib formed in each of the plates to prevent the hinging of the hook supporting portions thereof at the junction with the attaching portions, a bearing spool having a non-frictional journal support in the openings of the plates, and a suspension hook carried by the spool.

2. A suspension hook of the class described including a hanger unit consisting of a pair of hanger plates of angular cross-section providing oppositely disposed attaching flanges and complemental supporting plates, an obliquely disposed reinforcing rib formed at the junction of the securing flanges and pendant portions of said hanger members, and said plate portions being provided with a journal opening; a bearing spool having a non-frictional journal support in the openings of the plates, and a suspension hook carried by the spool.

In testimony whereof we hereunto affix our signatures in the presence of two witnesses.

CHARLES F. WALP.
ATWOOD J. HICKS.
FRED O. REEDY.

Witnesses:
MARTIN L. THOMAS,
FRED R. LONG.